United States Patent [19]

Southard

[11] Patent Number: 4,594,919
[45] Date of Patent: Jun. 17, 1986

[54] SHARPENING OF CHAIN SAWS

[76] Inventor: Albert A. Southard, R.R. #3, Council Grove, Kans. 66846

[21] Appl. No.: 553,053

[22] Filed: Nov. 18, 1983

Related U.S. Application Data

[63] Continuation-in-part of Ser. No. 341,771, Jan. 22, 1982, Pat. No. 4,429,596.

[51] Int. Cl.$^4$ .................... B23D 63/10; B23D 63/16
[52] U.S. Cl. ........................................... 76/36; 29/80
[58] Field of Search ............... 76/25 A, 36, 31, 74, 76/37; 29/78, 80

[56] References Cited

U.S. PATENT DOCUMENTS

| | | | |
|---|---|---|---|
| 2,664,017 | 12/1953 | Cox | 76/25 A |
| 2,687,561 | 8/1954 | Anderson | 76/37 |
| 2,813,438 | 11/1957 | Paradis et al. | 76/37 |
| 2,815,686 | 12/1957 | Harrison et al. | 76/37 |
| 2,818,752 | 1/1958 | Grandberg | 76/31 |
| 3,089,351 | 5/1963 | Nyberg | 76/25 A |
| 3,172,307 | 3/1965 | Kephart, Jr. | 76/25 A |
| 3,313,184 | 4/1967 | Granberg | 76/25 A |
| 3,327,567 | 6/1967 | Penberthy | 76/36 |
| 3,354,753 | 11/1967 | Kennemore | 76/37 |
| 3,744,349 | 7/1973 | Juncker | 76/31 |
| 3,796,113 | 3/1974 | Granberg | 76/25 A |
| 3,867,853 | 2/1975 | Lawless | 76/36 |
| 3,901,105 | 8/1975 | Ayer | 76/36 |
| 3,905,118 | 9/1975 | Ballew | 76/36 |
| 4,173,908 | 11/1979 | Aksamit | 76/25 A |

FOREIGN PATENT DOCUMENTS 2727447 4/1978 Fed. Rep. of Germany ..... 76/25 A

Primary Examiner—Roscoe V. Parker
Attorney, Agent, or Firm—Robert E. Breidenthal

[57] ABSTRACT

Chain saw sharpening apparatus that incorporates a rotary file replaceably journaled in a guide structure, with the file coupled to or adapted to be coupled to an electric driving motor. The guide structure has finger or handgrip at one end remote from the motor, and the latter is provided with a handgrip or can be hand-gripped directly. The rotary file is provided adjacent its end remote from the motor with a radial enlargement that is at least in part defined by a surface of revolution enabling its function as a stop or as a thrust bearing. A guide bracket is provided that can be mounted on the chain saw bar; such bracket being provided with adjustable upstanding guide pins for coacting with guide slots in the guide structure.

9 Claims, 31 Drawing Figures

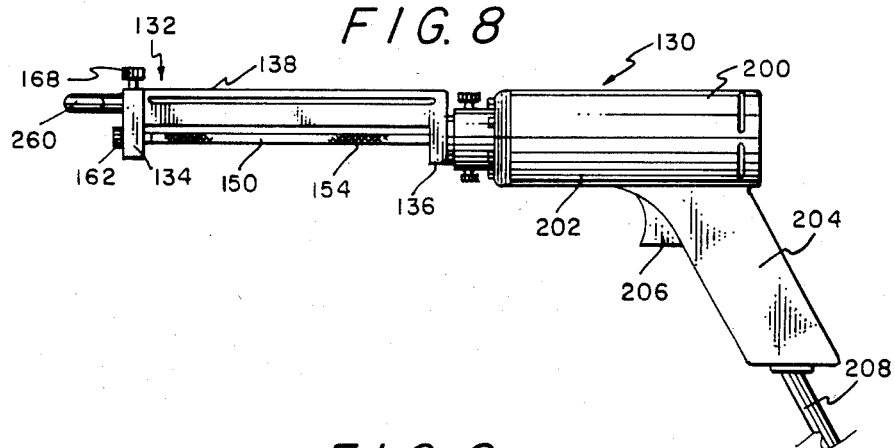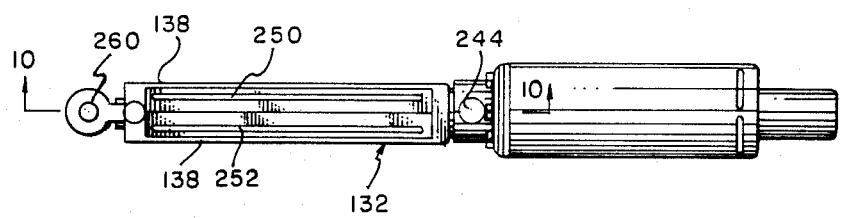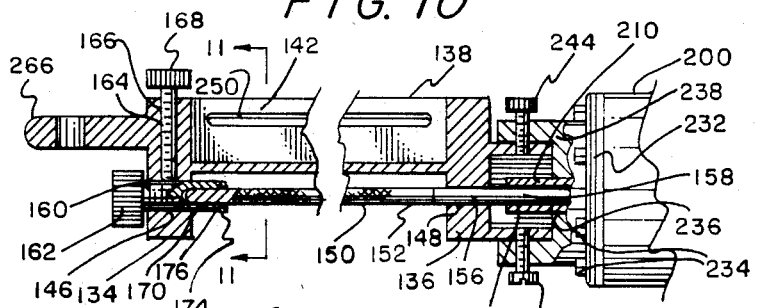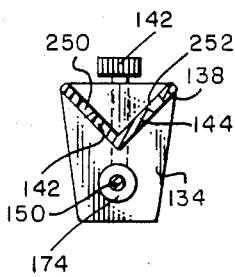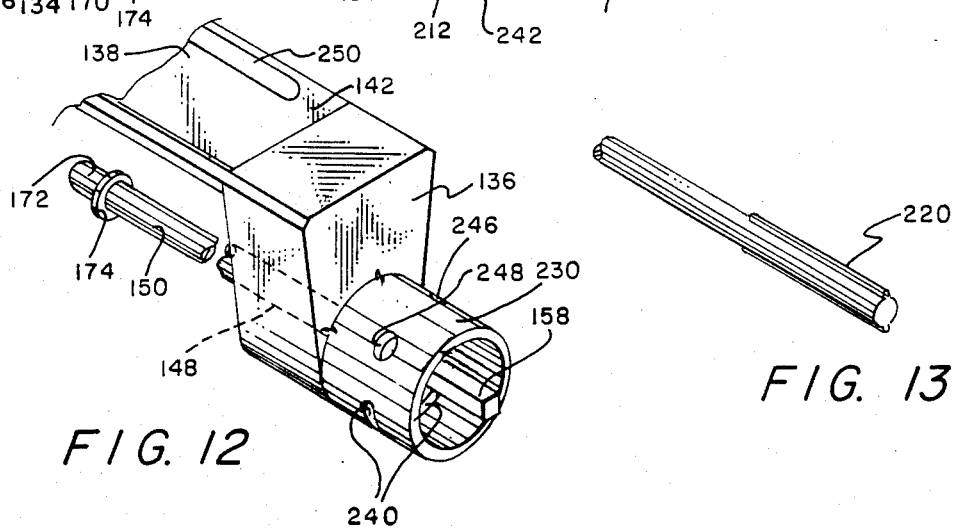

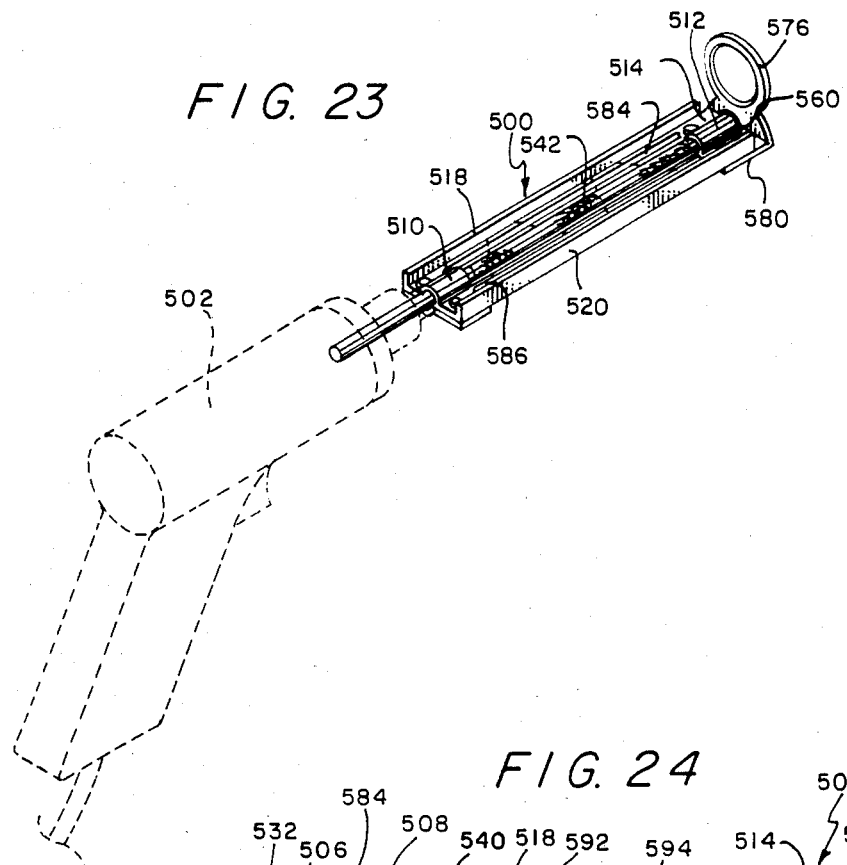
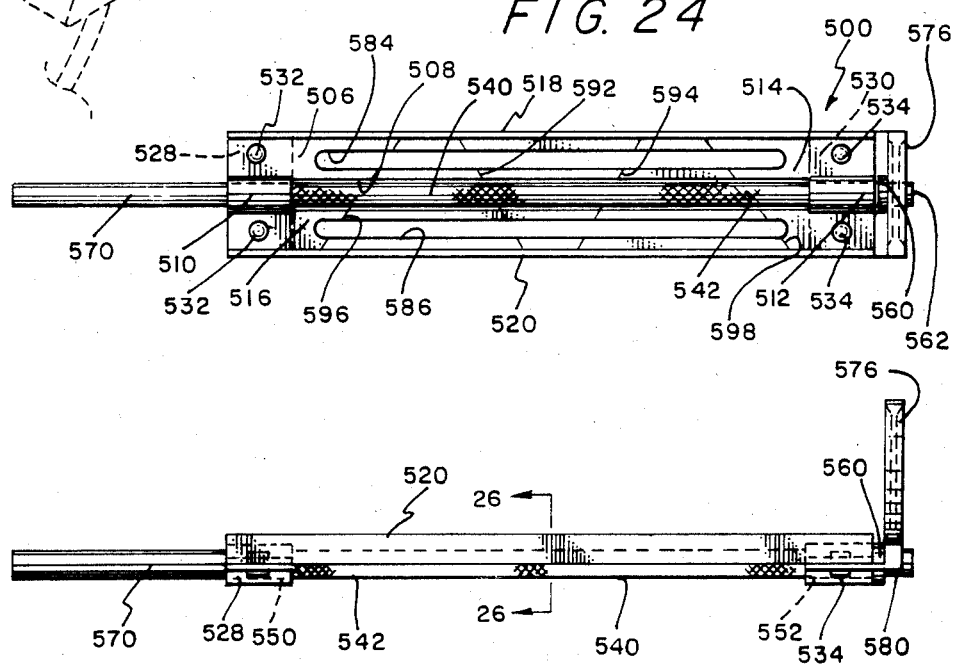
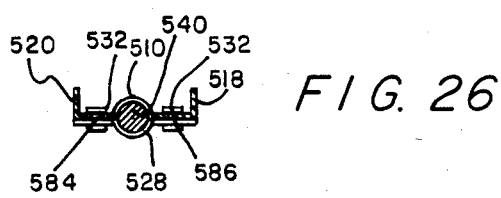

SHARPENING OF CHAIN SAWS

This application is a continuation-in-part application of my copending application entitled ROTARY STEEL FILING APPARATUS FOR SHARPENING SAW CHAINS, bearing application Ser. No. 06/341,771 that was filed Jan. 22, 1982 now U.S. Pat. No. 4,429,596, which issued Feb. 7, 1984.

The present invention relates to new and useful improvements in apparatus for and methods of sharpening chain saws, and more particularly pertains to an improved rotary file, a power drive for the file, and the guidance of the file during a sharpening operation.

A background application of prior art pertaining to the sharpening of chain saws can be derived from consideration of the following U.S. Pat. Nos. 2,818,752; Granberg; Jan. 7, 1958; 3,313,184; Granberg; Apr. 11, 1967; 4,173,909; Aksamit; Nov. 13, 1979; 3,172,307; Kephart, Jr.; Mar. 9, 1965; 3,744,349; Juncker; July 10, 1973; 2,813,438; Paradis et al.; Nov. 19, 1957; 3,327,507; Penberthy; June 27, 1967.

A further appreciation of related prior art will be gleaned from inspection of a product of Omark Industries of Portland, Oreg. under the trademark OREGON, namely, a blister packed "File Guide With Extra File" with instructions printed thereon, and identified by the manufacturer with the reference numeral "25894".

The substance of the disclosures of the above listed patents and the above product are incorporated herein by reference.

The present invention has the same general objectives as set forth in the above-identified parent application and in addition has the objective of providing a combined guide and rotary mounting for a file that either incorporates a prime mover or affords means for detachably connecting a rotary drive to the file.

Another objective is to provide a rotary file that has a radial enlargement that can serve as a stop and/or as a thrust bearing limiting longitudinal movement of the file in one direction.

A broad aspect of the invention involves in chain saw sharpening apparatus, an elongated frame having front and rear ends, an elongated file having first and second ends an an intermediate extent having a cutting surface of generally cylindrical configuration, a forward mounting means adjacent the front end of the frame for detachably and rotatably mounting the first end of the file on the frame, a rear means adjacent the rear end of the frame for detachably and rotatably connecting the frame to the file adjacent the second end of the latter, and said frame having a projection adjacent its front end adapted for manual engagement by the user when manipulating the frame with the file rotating, said frame and file being so constructed and arranged so that the intermediate extent of the file is unobstructed radially by the frame in one direction from the latter.

Another important aspect of the invention involves an elongated rotary file having first and second ends, such file being provided with a radial enlargement adjacent its first end, with such enlargement having a surface of revolution facing at least one of the ends of the file, and said file being adapted adjacent its second end for coupling to a rotary drive means.

Disclosure documents pertaining to the present invention have been filed with the Patent and Trademark Office, such documents comprising the following: Ser. No. 106,888 dated Mar. 15, 1982; Ser. No. 106,930 dated Mar. 18, 1982; Ser. No. 107,093 dated Mar. 22, 1982; Ser. No. 107,449 dated Apr. 8, 1982; Ser. No. 108,023 dated Apr. 28, 1982; Ser. No. 113,872 dated Jan. 10, 1983; Ser. No. 113,897 dated Jan. 11, 1983.

Preservation of such documents is requested.

The invention and its practice will be best understood in the light of the following description of preferred embodiments thereof that are presented in conjunction with the accompanying drawings, wherein:

FIG. 8 is a side elevational view of a combined guide, rotary file, and dedicated electric hand drive, the same being a different embodiment from that suggested in dashed outline in FIG. 1;

FIG. 9 is a top plan view of the embodiment shown in FIG. 8;

FIG. 10 is a fragmentary and enlarged vertical sectional view taken upon the plane of the section line 10—10 in FIG. 9, with the fragmentary showing of the drive being primarily in elevation and with the view being centrally broken to shorten the overall length of the drawing;

FIG. 11 is a vertical transverse sectional view taken upon the plane of the section line 11—11 in FIG. 10, with hidden details being shown in dashed lines;

FIG. 12 is a fragmentary, broken and enlarged isometric showing of the guide of FIGS. 8–11 and its structure specially adapted to couple the guide and its rotary file to the electric drive, with hidden details being shown in dashed outline;

FIG. 13 is an enlarged and fragmentary illustration of a modified shape of an end portion of the file for coupling to a mating female part of the electric drive;

FIG. 23 is an isometric view of still another embodiment of a combined guide and rotary file, with a conventional electric hand drill and its chuck being shown in dashed outline in operatively coupled relationship to the file;

FIG. 24 is an enlarged top plan view of the embodiment shown in FIG. 23;

FIG. 25 is a side elevational view of the embodiment shown in FIGS. 23 and 24 with hidden details being shown in dashed outline;

FIG. 26 is a transverse sectional view taken upon the plane of the section line 26—26 in FIG. 25;

Figure 27:
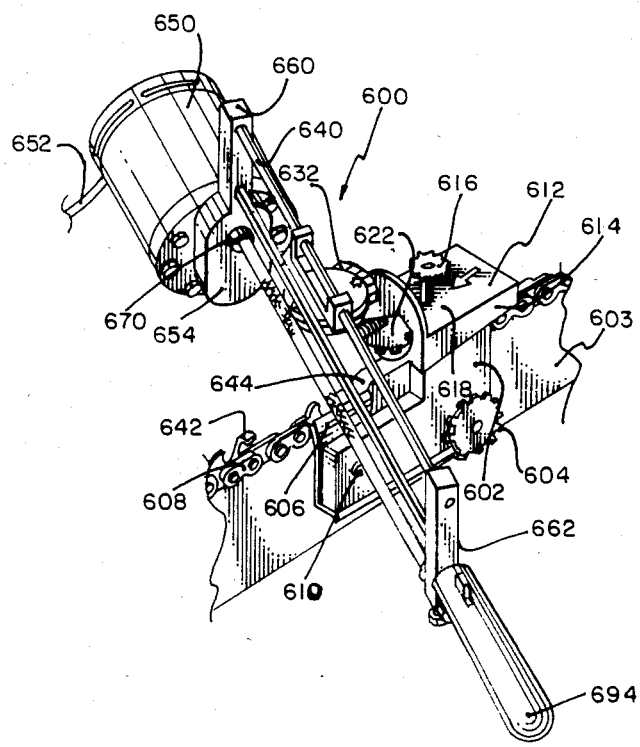
Figure 28:
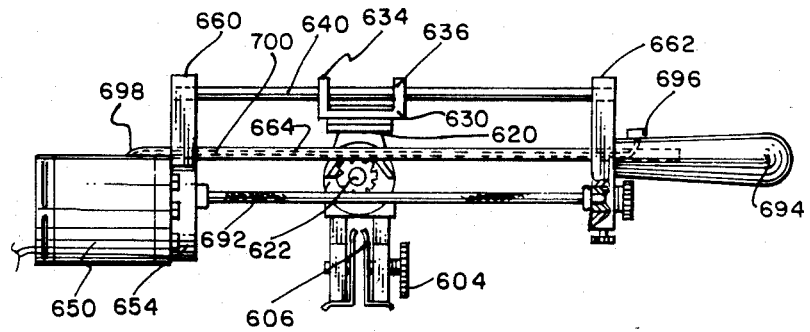
Figure 29:
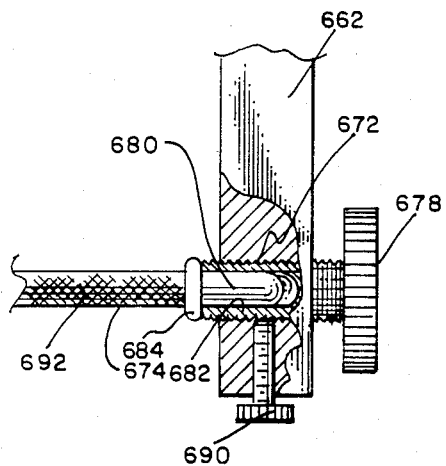

FIG. 27 is an isometric view of a final embodiment of the invention mounted on a fragmentarily shown bar and chain, such embodiment being electrically powered and having a handle remote from the drive motor, and incorporating conventional features such as depicted in U.S. Pat. Nos. 2,818,752 and 3,313,184;

FIG. 28 is a side elevational view on a reduced scale of the sharpening apparatus of FIG. 27, with the bar and chain saw deleted, and with the axis of the rotary file being turned to be normal to vertical medial plane of the mounting bracket;

FIG. 29 is an enlarged detail view, partially in section, illustrating the removable journal structure for the file, as well as the radial enlargement of the file that serves as a thrust bearing for the file in conjunction with the journal structure.

Figure 30:
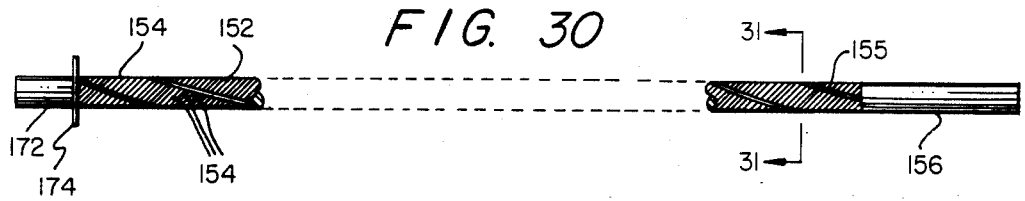
Figure 31:
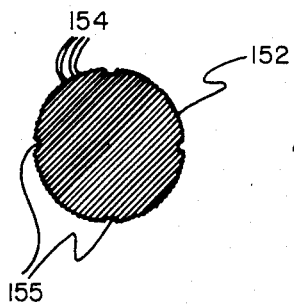

FIG. 30 is a side elevational view of a cylindrical rotary file;

FIG. 31 is an enlarged transverse sectional view of the rotary file taken upon the plane of the section line 31—31 in FIG. 30.

Referring now to the drawings, wherein like numerals designate like parts throughout the various views, attention is initially directed to the embodiment of the invention shown in FIGS. 1-7, wherein the reference numeral 10 designates a guide bracket generally.

The guide bracket 10 comprises an integral body 12 that can be made of metal machined from a suitable block or casting of aluminum, brass or ferrous material, or be die cast of zinc, for example, or the same can be made of any suitable synthetic resin. The body 12 has a vertical plane of symmetry and includes spaced vertical side walls 14 and 16 that are joined at their rear and front extremities by spaced web portions 18 and 20. The facing vertical sides 22 and 24 of the web portions 18 and 20 are wedge shaped as clearly shown in FIGS. 1 and 3.

The exposed upper surfaces 26 and 28 of the side walls 14 and 16 of the body 12 are horizontal and coplanar as clearly shown in the drawings.

As in the case of the somewhat analogous template body 40 of the above identified parent application, means is provided for securing or detachably and adjustable clamping the body 12 to a chain saw bar 30 with the body straddling bar 30 and the upper flight of the saw chain 32 entrained thereover. Such means comprises a pair of threaded stops 34 and 36 threaded through the wall to project a small interval into the space 38 between the walls 14 and 16 to engage the bar 30. A finger grip headed screw 40 is threaded through the wall 16 to clamp the bar 30 against the stops 34 and 36 on being finger tightened.

Figure 7:
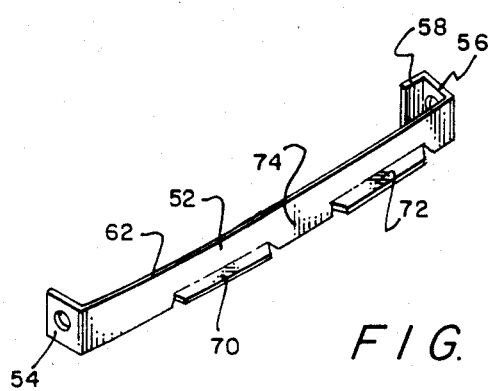
FIG. 7 is an enlarged isometric view of one of the chain centering devices of the guide bracket.
Figure 14:
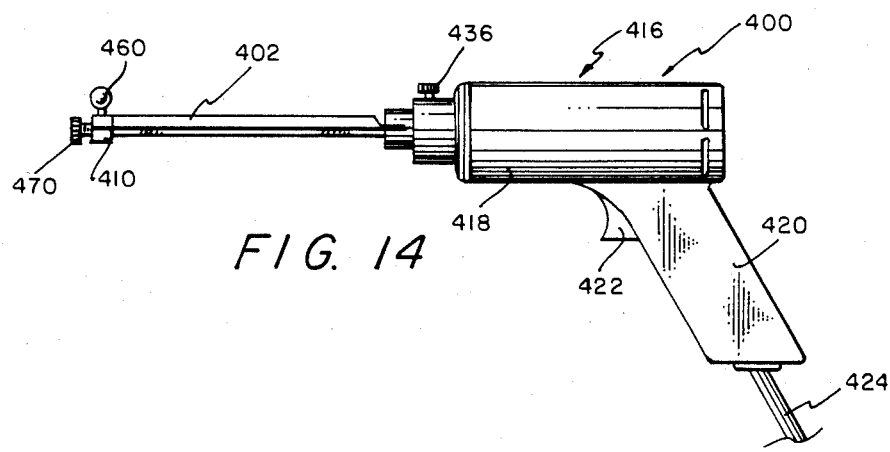
FIG. 14 is a side elevational view of another embodiment of a guide and its rotary file and shows the latter specially coupled to an otherwise conventional electric hand drill.
Figure 15:
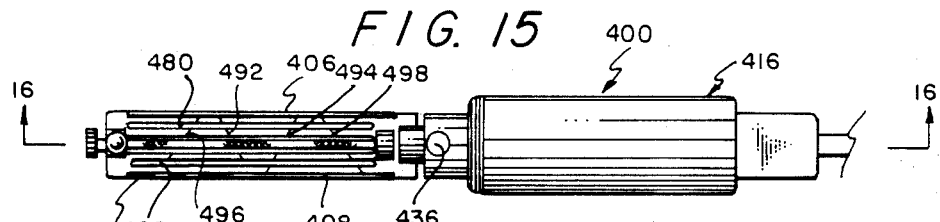
FIG. 15 is a top plan view of the embodiment shown in FIG. 14.
Figure 16:
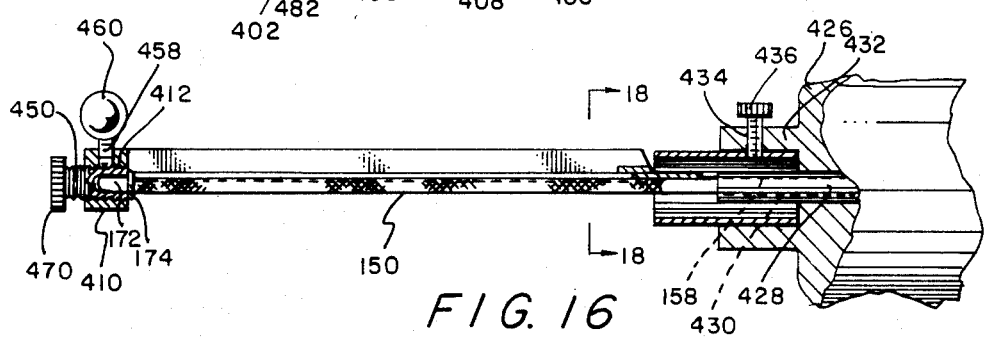
FIG. 16 is an enlarged and fragmentary vertical sectional view taken upon the vertical plane of the section line 16—16 in FIG. 15, with hidden details being shown in dashed outline and with the drive motor primarily in elevation.
Figure 17:
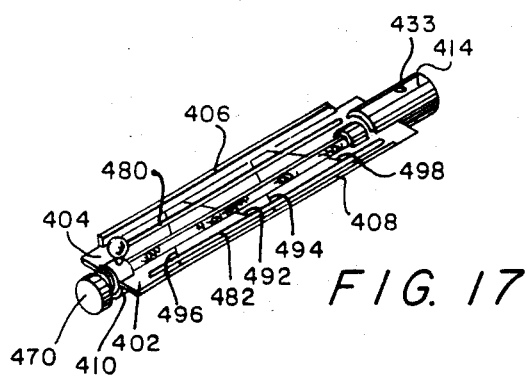
FIG. 17 is an isometric view on reduced scale of the guide and file structure FIGS. 14–16 with the drive removed.
Figure 18:
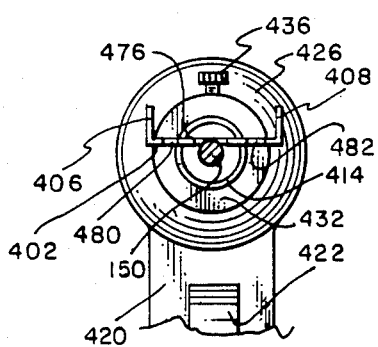
FIG. 18 is a fragmentary sectional view of the embodiment shown in FIGS. 14–17, the view being taken upon the plane of the section line 18—18 in FIG. 16.
Figure 19:
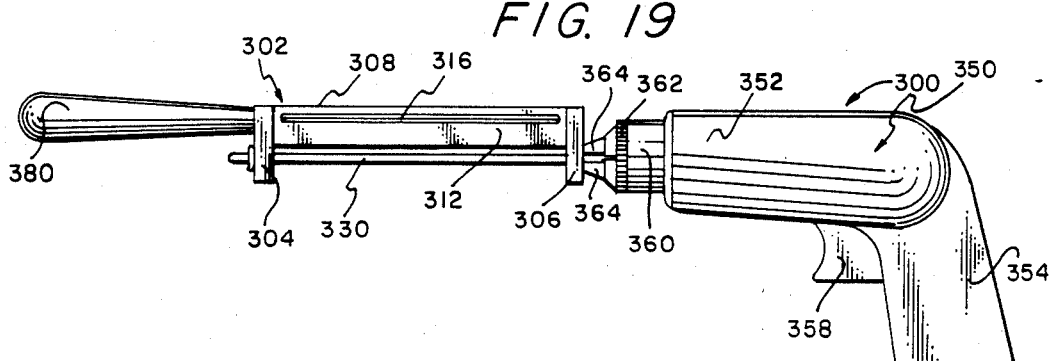
FIG. 19 is a side elevational view of yet another embodiment of the invention wherein the electric drive is comprised of a conventional electric hand drill having a conventional chuck detachably connected to an end of a rotary file exposed from its combined guide and rotary mounting.
Figure 20:
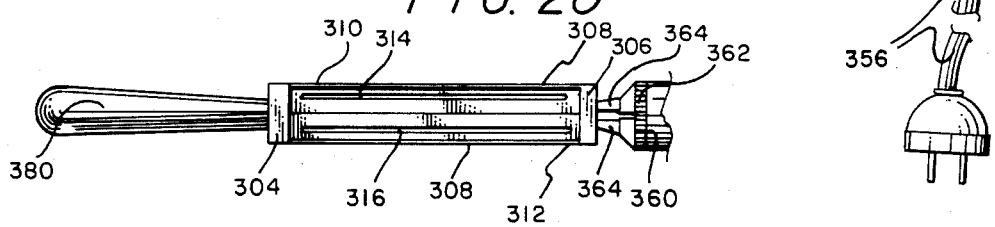
FIG. 20 is a fragmentary top plan view of the embodiment shown in FIG. 19.
Figure 21:
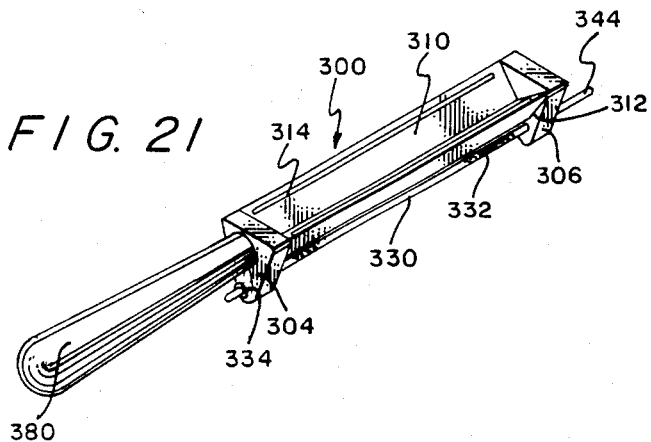
FIG. 21 is an isometric view of the embodiment shown in FIGS. 19 and 20.

A pair of resilient steel pressure tension springs 50 and 52 are mounted on the walls 14 and 16 for centering the saw chain 32. The springs are mirror images of each other. As best shown in FIG. 7, the spring 52 is elongated and has an apertured right angled portion 54 at one end, with the other end having an apertured end portion 56 that joins the main extent of the spring at an obtuse angle preferably of less than 1.20° for a purpose to be presently explained. The spring portion has a length somewhat exceeding the thickness of the wall 16 and terminates in an edge portion 58 angled thereto about 90°, preferably a few degrees less than 90°.

Figure 1:
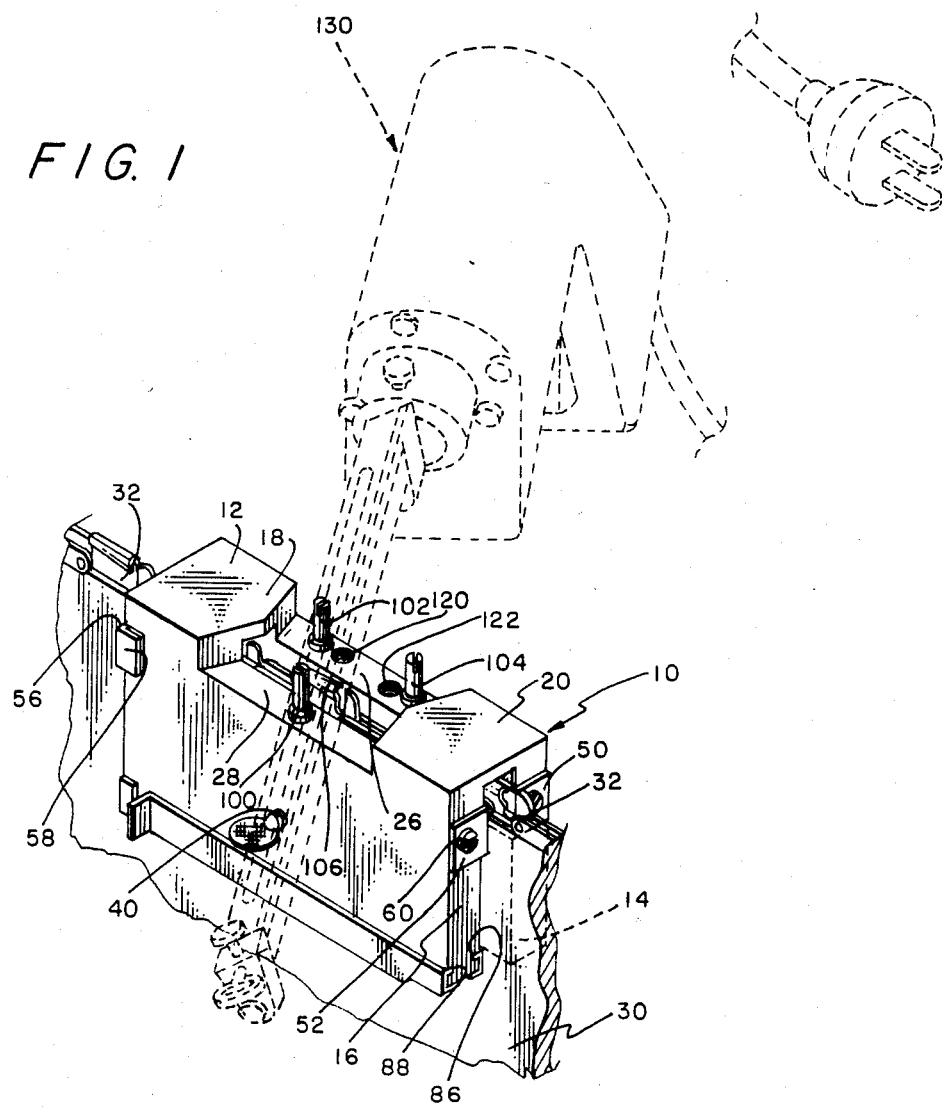
FIG. 1 is an isometric view of the guide bracket and shows the same mounted in operative position on a fragmentarily illustration of the saw bar and the saw chain carried thereby. A combined file guide and rotary mounting together with an electric hand drill coupled to the file is shown in dashed outline in operative relation to the guide bracket.
Figure 2:
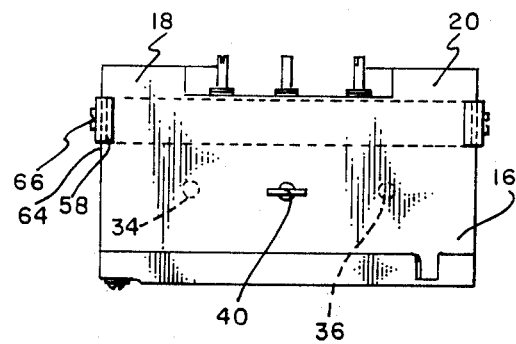
FIG. 2 is a side elevational view of the guide bracket of FIG. 1.
Figure 3:
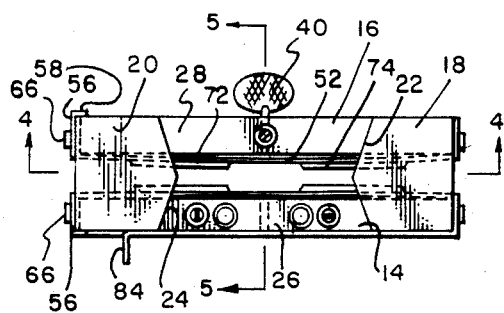
FIG. 3 is a top plan view of the guide bracket with hidden details being shown in dashed outline.
Figure 4:
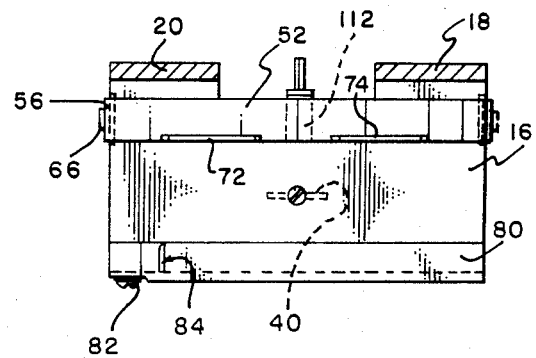
FIG. 4 is a vertical and longitudinal sectional view taken upon the plane of the section line 4—4 in FIG. 3 with hidden details being shown in dashed outline.
Figure 5:
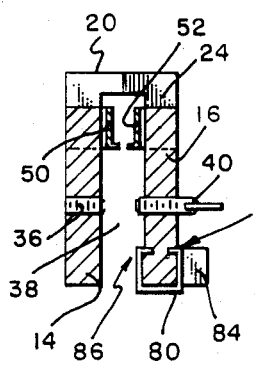
FIG. 5 is a vertical and transverse sectional view taken upon the plane of the section line 5—5 in FIG. 3.

The principle extent of the spring 52 is disposed along the upper and inner face of the wall 16 and has the apertured end portion 54 securely fastened to an end of the wall 16 by a screw 60. The other end 58 of the spring 52 is disposed to face the outer face of the wall 16 at the other end of the latter as shown in FIG. 1. The length of straight intermediate extent 62 of the spring 52 is slightly greater than the length of the wall 16, and the arrangement is such that the portion 56 is inclined to the end 64 of the wall 16, whereby the tightening of a screw 66 to urge the spring portion 58 to yieldingly flex toward the end 64 of the wall causes the intermediate extent 62 of the spring 52 to bow outwardly from the inner side of the wall 16 toward the wall 14. In a similar manner adjustment of a corresponding screw 66 of the spring causes the intermediate extent 62 of the spring 50 to bow to any desired extent toward and away from the wall 16 and its counterpart of the spring 52.

The flexing or bowing of the springs 50 and 52 is not uniform along their extents by reason of spaced portions of the lower edges of the springs being formed as flanges. Such feature is clearly shown in FIG. 7 with respect to the spring 52, with such flanges being indicated at 70 and 72. As the flanges 70 and 72 tend to stiffen the springs 50 and 52, the bowing or flexing mentioned above occurs largely in the spring portion 74 between the flanges 70 and 72. Such friction serves to guide the chain 32 into a centered position as the chain is moved along the bar 30 through the bracket 10. As in the case of the parent application, the flanges 70 and 72 also serve to coact with the chain 32 to obtain a proper relative vertical height of the bracket 10 relative to the chain 32 and bracket 10 when the latter is being positioned to be clamped to the bar 30 by means of the clamping screw 40.

A generally channel shaped depth gauge 80 with a thumb press tang 84 is disposed to extend along and fit into slots 86 and 88 in the lower margin of the side wall 16 and is retained in such storage position by slotted means and tension screw 82.

The guide bracket 10 is provided with a set of upstanding and adjustable guide pins 100, 102 and 104.

The guide pin 100 is situated at position substantially centered on the surface 28, and the pins 102 and 104, while being centered with respect to the thickness of the wall 14, are disposed at positions defining an isosceles triangle with the pin 100. The pin 100 is disposed at the apex of such isosceles triangle and a horizontal bisector of the isosceles triangle is normal to the vertical plane of symmetry of the body 12.

It might be correctly anticipated at this juncture that a line joining the pins 100 and 102 is inclined to the medial plane of a body 12 at an angle at which cuts of the teeth of the saw chain 32 are to be cut. Such angle of inclination would be applicable to alternate teeth while the angle of inclination defined by the pins 100 and 104 corresponds to the angle of cut for the intervening teeth. Accordingly, the pins 100 and 102 define the appropriate angle of cut for the tooth 106 shown in FIG. 1.

Figure 6:
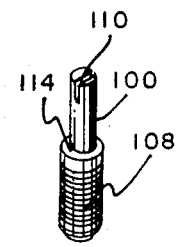
FIG. 6 is an enlarged isometric view of one of the adjustable and vertical guide pins of the guide bracket.

The pins 100, 102 and 104 are identical and a detailed description of the pin 100 will suffice for all. As shown in FIG. 6, the pin 100 has a relatively enlarged externally threaded portion 108 and has a kerf 110 at its upper end by means of which the pin 100 can be adjusted vertically. The wall 16 is provided with a threaded blind bore 112 that accommodates the threaded portion 108 of the pin 100. The threaded fit is sufficiently snug that, while the pin 100 can be adjusted, the pin 100 will retain its adjusted position unless a screwdriver is used. It will be noted that an upwardly facing shoulder 114 is defined at the juncture of the enlarged threaded portion 108 with the circular cylindrical configuration of the pin 100 thereabove.

It will be appreciated that the pins 102 and 104 are adjustable in a similar manner.

The spacing of the pins 102 and 104 correspond to a particular tooth cutting angle. As conventional saw chains are designed with differing cutting angles, the wall 14 is provided with a second pair of threaded blind openings 120 and 122 to afford alternative positions for the pins 102 and 104 respectively. Such alternative positions define another isosceles triangle having a different angle of inclination.

The reference numeral 130 designates a power driven rotary file shown in dashed outline, the same including, as will be presently described in conjunction with detailed illustrations thereof, slotted guide structure that guidingly receives the pins 100, 102 and 104 while resting upon the shoulders 114 thereof, whereby the teeth can be cut or sharpened with precision while the rotating file is moved parallel to its length.

Attention is now directed to FIGS. 8-13 pertaining to powered rotary filing such as shown in dashed outline at 130 in FIG. 1.

The apparatus indicated at 130, while being suitable for independent use, is especially suited for guided coaction with the guide bracket 10 in the sharpening of saw chains.

The apparatus 130 comprises an elongated frame 132 comprised of front and rear headers 134 and 136 integrally connected by an elongated guide member 138 having a "V" shaped transverse section defined by downwardly convergent and integrally joined right 142 and left 144 flat plates as best shown in FIGS. 10 and 11.

The headers extend below the frame member 138, and as best shown in FIG. 10, the headers are respectively provided with aligned openings 146 and 148. The openings 146 and 148 define a line parallel to the elongated member 138 which lies in a plane bisecting the dihedral angle defined by the guide plates 142 and 144.

An elongated rotary file 150 is provided having an intermediate or central extent 152 that is cylindrical in transverse section and surfaced by cutting teeth 154 and flutes or grooves 155 that may be of a general character as those of the file disclosed in my previously mentioned U.S. Pat. No. 4,429,596. An untoothed portion 156 of the file 150 is journaled through the opening 148, and the rear end of the file terminates in a noncircular portion 158 that extends rearwardly of the rear header 136.

The opening 146 is threaded to accommodate therethrough an externally threaded element 160, the latter being provided with a knurled knob 162 for facilitating manual adjustment of the position of the bearing element 160. The bearing element 160 may be secured in adjusted position by means of an elongated set screw 164 that is threaded through a threaded opening 166 in the front header 134 to bear against the bearing element 160. The set screw 164 is provided with a knob 168 for facilitating movement into and out of engagement with the bearing element 160. The bearing element 160 is provided with a blind axial bore 170 that rotatably receives therein a cylindrical end portion 172 of the file 150. The file is provided with an integral radial enlargement 174 having a surface of revolution that faces and slidingly engages the end of the bearing element 160 in which the blind bore 170 is positioned.

The arrangement is such that the bearing element 160 serves to carry lateral loads on the file 150 and to coact with the radial enlargement 174 as a thrust bearing.

The teeth 154 of the central extent 152 of the file 150 are in the nature of a multiplicity of nested serrations, each of which would be of continuous helical or spiral configuration except for the flutes or grooves 155. The helical character of each tooth 154 is such as to be steeply inclined to a generating directrix of the overall cylindrical configuration and can be so inclined with from about 35° to about 45° being preferred. The nested single-cut heliform teeth 154 collectively present about 60 to about 80 teeth per inch along the generating directrix. The teeth 154 preferably have a height of approximately 45 to 50 percent of the spacing of adjacent convolutions of the teeth 154 along the generating directrix.

In longitudinal section the teeth 154 are preferably inclined in their radial extent or height toward the left end portion as the file 150 as shown in FIG. 30 so as to effect a markedly greater cutting action when the file 150 is moved to the left as viewed in FIG. 30.

As shown, the toothed extent 152 of the file 150 intermediate the end portions 156 and 172 is provided with a plurality of uniformly nested flutes or grooves 155 (four being shown) of helical configuration that are inclined or turn in a direction opposite that of the rows of teeth 154. As quite plain in FIG. 31, the flutes 155 are of much greater size and depth than the teeth 154 and in addition are much less steeply inclined to the directrix, preferably less than about 15°. The flutes 155 serve to clean the filling teeth 154 of cuttings as the filing or sharpening proceeds. Also the flutes 155 enable the file 150 to be operated efficiently at a higher rate of rotation than would otherwise be the case. In addition, the flutes 155 assist in distributing cutting oil and in cooling the teeth 154.

The reference numeral 200 designates an electric motor having a housing 202 that is provided with a handle 204 equipped with a control switch (not shown)

having a trigger-like finger actuated element 206 for controlling energization of the motor from flexible power cord partially shown at 208.

As thus far described the motor 200 is conventional and in the nature of common electric hand drills, and indeed the actuator 206 can be conventional to the extent that increased finger pressure upon and movement of the actuator 206 against spring resistance to increase the motor speed.

The motor 200 has a rotary output shaft 210 (see FIG. 10). The shaft has a blind axial opening 212 therein adapted to slidingly receive the end portion 158 of the file 150 therein. As best shown in FIG. 12, the file end portion 158 is noncircular in transverse section. The opening 212 has a configuration that mates with that of the file end portion 158, whereby the file 150 will rotate in unison with the motor shaft 210.

As indicated previously, the motor 200 may optionally be of controllable variable speed in a conventional manner. Preferably, though optionally, the motor 200 may incorporate conventional reduction gearing, not shown, whereby greater torque can be delivered at slower rotational speeds.

The file portion 158 need not be of polygon configuration as shown in FIG. 12 but the same can be of any desired noncircular configuration such as that indicated at 220 in FIG. 13, it being understood that the opening 212 in the shaft 210 would be given a complementary or mating configuration. It is thought that the principal advantage of distinctive transverse configuration would reside in a manufacturer being able to strengthen his position in marketing replacement files in a manner quite analogous to that practiced by manufacturers of safety razor blades to assure a market for their product.

Means is provided for coupling the guide frame 132 to the motor 200. Such means comprises the rear header 136 being provided with a rearwardly extending annular boss 230 that is concentric about the axis of the file 150. The motor housing 202 includes a head 232 joined thereto by cap screws 234 and through which the shaft 210 is journaled at 236. The head 232 is provided with an integral annular boss 238 that is concentric about the axis of the drive shaft and which has an internal diameter such as to slidingly receive thereinto the annular boss 230 as shown in FIG. 10. The lower side of the annular boss 230 is provided with an arcuate slot 240 that essentially subtends an angle about 90 degrees. A cap screw 242 is threaded through the bottom of the boss 238 and is slidably received through the slot 240. The cap screw 242 is tightened in the boss 238 to secure against inadvertent dislodgment, the arrangement is then such that the frame 132 is allowed angular adjustment between positions predetermined by the length of the slot 240 due to the limiting action of the screw 242. Another cap screw 244 is threaded through the top of the boss 238 and the same will extend through openings 246 and 248 in the boss 230 depending upon which of the limiting positions the frame 132 is in with respect to the motor housing boss 238. Holes 246 and 248 have centers spaced apart 90°. The screw 244 is snuggly tightened against the boss 238 to retain the selected relative positions of the frame 132 and the motor 200. When the other position is desired, the screw 244 is loosened sufficiently to clear the boss 230, whereupon the frame 132 is turned to its other limiting position, and the screw 244 is again retightened.

The right and left guide plates 142 and 144 are respectively provided with elongated guide slots 250 and 252 having widths that slidingly accommodate the upper cylindrical portions of the guide pins 100, 102 and 104.

As clearly shown in FIG. 11, the slots 250 and 252 are slightly chamfered so that the user can, if necessary, slightly rock the guide about its longitudinal dimension as an axis and thereby slightly vary the height of the cutting action of the file without disturbing the direction of the files extent.

In use, the powered file 130 is oriented as shown in FIG. 1 and the guide plate 142 is disposed to rest flat upon the shoulders 114 of the guide pins 100 and 102 while guidingly receiving the latter through the guide slot 250. The user can then guidingly reciprocate the powered file 130 while holding the motor handle 204 in one hand and finger or hand gripping an apertured finger grip 260 that is integral with the forward header 134.

During this operation, the screw 244 is extended through the opening 248 in the boss 230.

After the tooth has been sharpened sufficiently, the user can then advance the chain 32 by two teeth and repeat the above operation. Alternatively the operator can adjust the screw 244 to extend through the other opening 246 in the boss 230 and then rest the left guide plate 144 upon the shoulders 114 of the guide pins 100 and 104 with the latter extending through the chamfered guide slot 252, whereby the reverse angle cut of sequentially adjacent teeth can be cut. Manifestly, it is easier to cut all the alternate teeth of one inclination, and then readjust the apparatus as described above and then proceed to cut all the other teeth (one half of the total teeth) having the opposite inclination.

Attention is now directed to another embodiment of the powered rotary file shown in FIGS. 19–22 and designated generally at 300. Like the apparatus shown in FIGS. 8–13, the apparatus 300 can be used independently, that is it has utility in and of itself alone, but preferably, as in the case of the apparatus shown in FIGS. 8–13, the apparatus 300 is used in combination with the apparatus shown in FIGS. 1–7 in lieu of apparatus shown in dashed outline in FIG. 1.

The apparatus 300 comprises a combined guide means and rotary file mounting structure designated generally at 302, the same comprising front and rear headers 304 and 306 that are integrally connected by a guide member 308 that is generally similar to the previously described guide or frame member 138.

The guide or frame member 138 is "V" shaped in transverse section and includes downwardly convergent and integrally joined, right and left, flat guide plates 310 and 312. The plates 310 and 312 are respectively provided with elongated chamfered guide slots 314 and 316 that correspond in shape and function to the previously described chamfered guide slots 250 and 252.

As in the case of the last described embodiment of the invention, the headers 304 and 306 are provided with aligned openings 318 and 320 that define an axis parallel to the slots 314 and 316 as well as to the juncture 322 of the plates 310 and 312. As clearly shown in FIG. 22, a rotary file 324 has smooth cylindrical portions 326 and 328 respectively journaled in the openings 318 and 320. An intermediate extent 330 of the file 324 between the portions 326 and 328 is also generally cylindrical, but with a toothed surface 332 adapted to cut an object when rotated and/or reciprocated against such object. The file 324 is provided with a radial enlargement 334 adjacent one end 336 thereof, such radial enlargement 334 having a surface of revolution 338 that faces and can slidingly engage the outer face 340 of the header 304 as a thrust bearing.

Figure 22:
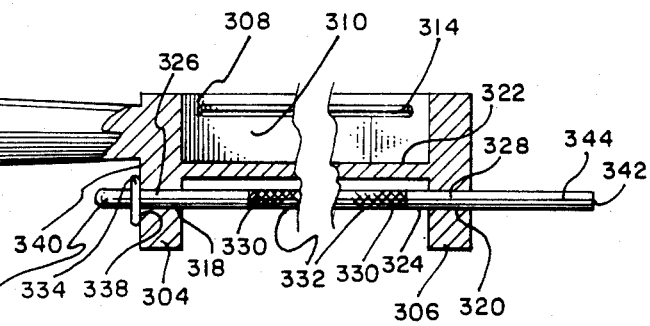
FIG. 22 is an enlarged side elevational view that is partially shown in central and longitudinal vertical section with the view being broken to shorten the length of the view.

In assembling the structure shown in FIG. 22, the file 324 is inserted successively through the openings 318 and 320 with the end 342 of the file being foremost. Plainly, the enlargement or bearing 334 limits the extent of such insertion with an end portion 344 projecting through the header 306. As the toothed portion 330 must pass through the opening 318 in which the file portion 326 is journaled, it will be evident to those skilled in the art that the overall diameter of the file portion 330 is at most equal to the diameter of th portion 326.

The reference numeral 350 designates a conventional electric hand drill that includes a body 352, a handle 354, a flexible power cord 356, and a trigger-like and finger actuable control 358 by means of which the user can selectively energize and deenergize the unit 350. The unit 350 may, if desired or deemed expedient, be such that the control 358 can be operated to vary the output speed of the unit 350.

Conventionally, the electric drill 350 has a conventional adjustable chuck 360. The chuck 360 also conventionally includes a relatively rotatable part 362 by mean of which the jaws 364 of the chuck 360 can be actuated to clamp down upon and to be unclamped from any cylindrical object inserted between the jaws 364.

In accordance with the present invention the projecting portion 344 of the file 330 is inserted between the jaws 364 while holding the bearing 334 in engagement with the header 304, after which the jaws 364 are cuased to tightly clamp upon the file portion 344. The insertion can be to the extent that the header 306 is engaged by the free axial ends of the jaws 364 (typically three in number). Indeed, such engagement is preferred so that the jaws 364 and the bearing 334 substantially preclude any endwise movement of the file 324. If the character of the axial ends of the jaws 364 require, or if it is otherwise deemed expedient to do so, a brass, nylon or Teflon bearing washer, not shown, can be disposed on the file portion 344 intermediate the header 306 and the chuck jaws 364 as will be evident to those skilled in the art.

In effect, a frame is constituted of the headers 304 and 306 and the connecting guide member 308, and such frame, as in the case of the embodiment shown in FIGS. 8-13, can be made of any suitable material such as steel, aluminum, zinc, or a suitable synthetic resin.

With or without an intervening washer, a thrust bearing relationship is established between the rotating chuck 360 and the header 306.

To augment the manual control over the file that may be exercised by the handle 354, and to prevent rotation of the file holding frame, the header 304 is provided with an integral handle 380 that is elongated and generally parallel to the file 330.

Though not specifically mentioned in connection with the previously described embodiment of the invention, the finger grip or handle 260 thereof is, as in the case of the handle 380, applied by the user not only to manipulate the file, but also to offset the torque imparted by the file to the frame by the prime mover or electric motor.

The use of the apparatus 300 in conjunction with the apparatus shown in FIGS. 1-7 will be manifest in the light of the previous description of such use of the apparatus shown in FIGS. 8-13.

Passing now to yet another embodiment of the powered rotary file that can be used independently or in combination with the solid line structure of FIGS. 1-7, attention is directed to FIGS. 14-18 wherein the alternative embodiment is designated generally at 400.

The apparatus 400 comprises a frame 402 constituted of an elongated and flat guide plate 404. The plate 404 is horizontal and preferably has upturned marginal right and left edges 406 and 408 to stiffen or reinforce the plate 404.

The front end of the plate is integral with or welded to a header 410 that extends below the plate 404 and which is provided with a threaded opening 412 therethrough that has an axis parallel to and spaced below the plate 402. The forward end of the plate is welded to a tubular member 414 that is coaxial with the axis of the threaded opening 412, with the member 414 projecting from the plate 402 in a direction opposite the header 410. A prime mover designated generally at 416 is provided that is generally similar to that disclosed in FIG. 8, the same comprising an electric motor having a housing 418, a handle 420, a triggerlike motor control 422 and an electric power cord partially shown at 424. The housing 418 includes a front housing 426 having an output shaft 428 journaled therethrough. The output shaft 428 has a blind and noncircular axial opening 430 therein. The front housing 426 has an integral annular boss 432 adapted to slidingly receive therein the previously described sleeve 414. The boss 432 is provided with a threaded opening 434 in the top thereof that aligns with an opening 433 in the sleeve 414 and a set screw 436 may be tightened in the sleeve 414 to extend through the opening 433 to retain the sleeve in fixed assembled relation to the boss 432. A threaded bearing element 450 similar to the previously described bearing element 160 is threaded in the opening 412 and rotatably receives therein the end portion 172 of the previously described file 150, with the radial enlargement 174 thereof rotatably engaging the header 410 as a thrust bearing. A set screw 458 is threaded through a mating opening in the top of the header 410 for releasably holding the bearing element 450 in adjusted relation in the opening 412. The upper end of the set screw 458 is provided with a knob 460 fixed thereto that serves two functions, namely, the obvious function of constituting a means for turning the screw 458 and the second function of serving as a finger grip or handle in a manner analogous to the use of the previously described finger grips or handles 260 and 380.

The noncircular end portion 158 of the file 150 slidingly mates with the complementary opening 430 in the shaft 428, whereby a driving relation between the shaft 428 and the file 150 is established. The described structure is dimensioned so that the end of the file portion 158 seat against the bottom of the opening 430 with a force adjustable by turning the knurled head 470 of the bearing element 450. The adjusted force is preferably quite light to minimize the load on the thrust bearing constituted of the radial enlargement 174. It will be appreciated that the described arrangement will minimize end play of the file 150 during use of the apparatus.

It will be readily apparent to those skilled in the art that components of the prime mover 416 serve as a rotary mounting for the noncircular end 158 of the file 150 while the detachable structure 402 provides a rotary bearing for the other end of the file 150.

The plate 402 is provided with an elongated medial opening or slot 476 directly overlying the file 150 through which the condition of the file 150 can be directly observed during use of the apparatus.

The plate 402 additionally is provided with elongated right and left chamfered guide slots 480 and 482 having minimal widths corresponding to diameters of the upper ends of the guide pins 100, 102 and 104.

In use, the sleeve 414 is positioned in the boss 432 and the screw 436 is tightened to preserve such attachment. A flat underside of the plate 402 can then, for example, be rested upon the top of the flat shoulders 114 of the pins 100 and 102 with the latter being slidably received in the guide slot 480. Alternatively, for example, the pins 100 and 104 can be used in guiding relationship with the slot 482. A further description of the use of the embodiment 400 with the solid line structure shown in FIGS. 1–7 is deemed to be unnecessary in the light of prior descriptions.

As mentioned previously, the powered rotary file 400 has utility totally apart from the structure shown in FIGS. 1–7. Such independent utility is additonally enhanced by the provision of scored indicia lines 492, 494, 496 and 498 scribed upon the upper surface of the plate 402. As in the case of a product of Omark Industries of Portland, Oreg., identified by the reference numeral or part number 16265 and bearing a statutory patent notice with respect to U.S. Pat. No. 3,327,567, the indicia lines 492 and 494 may be oppositely inclined at 60° with respect to the longitudinal extent of the plate 402. In a similar manner, the indicia lines 496 and 498 may be oppositely inclined 68° with respect to the longitudinal extent of the file 150 and the plate 402. As in the case of the above identified product, the lines 492–498 enable a user to visually gauge the angle at which he is cutting teeth. The angles mentioned above correspond to conventional angles of cut for various saw chains. In the use of the above patented product of Omark Industries, the user must effect all filing action by longitudinally moving the file, whereas the embodiment 400 does not require such longitudinal movement as the rotation of the file can of itself effect the necessary sharpening though it is preferred that the user effect longitudinal movement of the file during its rotation to distribute wear upon the file more or less uniformly along its length, though this is not essential.

The apparatus 400 can be fabricated of materials that have previously been indicated as being suitable for corresponding parts.

In a manner analogous to the use of a bearing washer in the apparatus 300, it will be evident that a bearing washer of any suitable metal or synthetic resin can be disposed about the file 150 and seated between the enlargement 174 and such header against which it serves as a thrust bearing if such a provision seems necessary or convenient for any reason.

Attention is now directed to yet another embodiment of the invention disclosed in FIGS. 23–26 and designated generally at 500. The powered rotary file structure 500 is suited to be driven by a conventional electric hand drill such as shown in dashed outline at 502 and which may conveniently be such as previously described at 350. The structure 500 comprises an elongated plate 506 having an elongated medial slot 508. The plate 506 is of arcuate configurations 510 and 512 at the opposite ends of the slot 508 as clearly shown in FIGS. 23 and 24. The configurations 510 and 512 are upwardly convex and the portions 514 and 516 of the plate 506 on opposite sides of the slot 508 are coplanar except for their marginal edges 518 and 520 which are bent upwardly for purposes of strengthening the structure.

The arcuate integral plate portions 510 and 512 jointly define with bearing plates 528 and 530 underlying and rivited at 532 and 534 to the plate 506 a pair of journals for rotatably receiving a file 540 therethrough that is parallel to the longitudinal extent of the plate 506.

The file 540 is partially disposed in the slot 508 and such portion 542 of the file is cylindrical, toothed and is in part disposed below the plane of the underside of the plate 506.

The portions 550 and 552 of the file 540 that extend through the journals partially defined by the arcuate plate portions 510 and 512 are cylindrical and smooth with the portion 552 being of a diameter at least as great as the overall diameter of the toothed extent 542 of the file 540. The file 540 is provided with a radial enlargement 560 adjacent one end 562 of the file, and such enlargement 560 rotatably engages an end of the journal defined by the elements 512 and 530 to constitute therewith a thrust bearing.

The other end portion 570 of the file 540 is cylindrical and projects from the plate 506 as shown so as to be drivingly engageable by the chuck jaws of a conventional electric hand drill 502. The dimensioning of parts is preferably such that the chuck jaws and the enlargement 560 engage the journals partially defined by the arcuate plate portions 510 and 512 so as to substantially prevent any end play of the file 540.

As suggested in connection with previously described embodiments of the invention, friction with the enlargement 560 and/or the chuck jaws can be reduced if deemed necessary or convenient by the provision of metallic or synthetic resin washers.

The end of the plate 506 opposite the prime mover or electric hand drill is provided with a substantial finger grip or handle 576.

The handle 576 extends upwardly from the plate 506 and is in the form of a large apertured disc. The handle 576 is provided with a pair of horizontally extending and laterally spaced mounting tabs 580 that underlie the journal defining element 530 and are secured to the plate 506 by the same rivits 534 as is the journal defining element 530.

The plate portions 514 and 516 are provided with elongated chamfered guide slots 584 and 586 for guiding coaction with the guide pins 100, 102 and 104. Explanation of this mode of use is not seen necessary in the light of foregoing descriptions.

As in the case of the last described embodiment of the invention, the upper surface of the plate 506 may have an inner pair of scribed guide lines 592 and 594 of equal and opposite inclination, and an outer pair of scribed guide lines 596 and 598 of equal and opposite inclinations differing from those of lines 592 and 594. Inclinations of 60° and 68°, for example, would be well suited for the tooth cut angles of many common saw chains.

The embodiment 500 is such that the same can be manufactured for high durability at low cost, and the same is of such simple design and so easy to use by an inexperienced user, it is believed in view of the wide distribution of electric hand drills that the use of powered rotary files will soon make the tiring entirely manual application of a file a thing of the past.

The ease and manner of replacing the spent files in each of the described embodiments will be readily appreciated as well as the fact that each of the illustrated embodiments enable a file to be fully used throughout its entire toothed extent. As less physical effort is required, it will be easily seen that a file can be more fully worn down before replacement than would otherwise be the case.

Attention is now drawn to an embodiment of the invention that is complete in itself and which is an improvement upon the apparatus quite similar to that disclosed in U.S. Pat. No. 2,818,752 which issued to Elof Granberg on Jan. 7, 1958. More specifically, the embodiment of the invention shown in FIGS. 27-29 and designated at 600 is an improvement upon apparatus marketed by Townsend Saw Chain Co., Division of Textron, Inc., Columbia, S.C. The improvement broadly comprises modifying the reciprocable guide frame and the file carried thereby so that the file is rotatably carried by the guide frame, and the provision of an electric drive motor mounted on the guide frame for rotating the file, whereby a saw tooth can be cut without it being necessary to concurrently move the file longitudinally.

The apparatus conventionally includes an inverted U-shaped bracket 602 that may be adjustably clamped to a saw bar 603 by use of a headed clamping screw 604. The apparatus also includes means 606 carried by the bracket 602 for gripping a saw chain 608 through the use of an adjustment screw 610.

Also conventionally, a frame support means 612 is pivotally mounted upon the bracket 602 for vertical swinging movement about a horizontal pivot 614 that is transverse to and spaced above the saw chain 608 as shown in FIG. 27. Also conventionally, an adjustment screw 616 on the base portion 618 of the support means 612 limits the downward swinging movement of the support means 612. The frame support means 612 includes a support fixture 620 that is secure to the support base 618 by a threaded means 622 in an angularly adjusted relation thereto about the axis of the threaded means 622, such axis being in the plane of the bar 603 and approximately horizontal when the support means 612 is in its lower limited position.

Conventionally also, a guide fixture 630 rotatably rests upon the top of the fixture 620, and is secured in rotatably adjusted position thereon by a clamping screw, not shown, that constitutes the axis of relative rotation. The axis of the conventional clamping screw is normal to the axis of the screw 622 so that the axis of rotation of the guide fixture 630 is roughly vertical. Indicia 632 is provided as is conventional to indicate the relative angular positions of the fixtures 620 and 630 in the customary manner.

The guide fixture 630 conventionally includes an integral pair of spaced and upstanding apertured tabs 634 and 636 through which a conventional guide rod 640 slidably extends.

The structure thus far described in connection with the embodiment 600 is entirely conventional and its use in connection with the mounting thereof on the saw bar 603 and in appropriate relationship to a saw chain 608 for cutting the teeth 642 thereof is well known and is fully described in the instructions provided with the above identified product. As in the commercially available product, the apparatus 600 also includes a leaf 644 carried by the support base for gauging the proper longitudinal positioning of the saw chain 608 on the saw bar 603 for the cutting of the tooth 642. The structure, function and use of the leaf 644 is evident on inspection of the commercial product and on reading the instructions accompanying the same.

The novel aspects of the embodiment 600 will now be set forth. An electric motor 650 is provided that is energizable by a flexible electric cord partially shown at 652. The electric motor 650 is connected to reduction gearing, not shown, that is disposed in a housing 654 that is suitably fixed to the electric motor 650.

An open frame is provided that is comprised of spaced end posts 660 and 662 that are connected by the previously described cylindrical guide rod 640. A generally rectangular configuration for the frame is completed by the provision of an elongated tubular frame member 664 connecting the posts 660 and 662 in spaced parallelism to the guide rod 640.

The frame post 660 is fixedly secured at its lower end to the reduction gear housing 654 in an arrangement such that the output shaft 670 of the reduction gearing is coplanar with and parallel to the guide rod 640 and the tubular frame member 664. The output shaft 670 is spaced below the tubular member 664 and is in alignment with a threaded opening 672 in the lower end portion of the frame post 662. A rotary file 674 is provided having a noncircular end portion, which is not shown but similar to the previously disclosed file portion 158, and such noncircular file portion is removably seated in a mating axial recess, also not shown, in the output shaft 670, whereby rotation is imparted to the file 674 by the electric motor 650. A bearing element 678 is adjustably threaded in the opening 672 and rotatably receives a cylindrical end portion 680 of the file 674 in a recess 682 provided therein. The file 674 is provided with a radial enlargement 684 that serves as a thrust bearing against the inner end of the bearing element 678. Though not shown, a bearing washer can be disposed between the enlargement 684 and the inner end of the bearing element 678.

The bearing element 678 may be tightened to light sliding engagement with the facing surface of rotation of the enlargement 684 and retained in such adjusted position by a threaded set screw 690 as clearly shown in FIG. 29.

As in the case of the previously described rotary files, the file 674 has a toothed intermediate extent 692 operable to cut when rotated against or longitudinally moved against an object. The toothed extent 692 is preferably such as that of the file disclosed in the aforementioned parent application.

A longitudinally extending handle 694 is fixed to the post 662 in alignment with the tubular member 664, and an electric circuit means is provided for controlling energization of the motor 650 that includes a thumb operable switch control element 696 mounted on the handle 694. The electric switch, not shown, that is operable by the control element 696 is connected to the electric motor at 698 by electric conductors indicated by dashed lines at 700 in FIG. 28 that in part extends through the hollow frame member 664. The electric switch can be of conventional character and include a motor speed control provision responsive to the decree of movement of the element 696 that may be effected by the thumb of the user.

The use of the apparatus 600 will be readily apparent. Except for securing the file 674 by the bearing element 678, the apparatus 600 is adjusted in exactly the same manner as the commercial product identified above, and indeed, when the motor 650 is not energized, the apparatus is used in the same way by reciprocating the rod 640 in the guide tabs 634 and 636 by use of the handle 694. However, much labor can be saved by using the motor 650 to rotate the file 674. More uniform wear throughout the length of the file can be obtained, as there is a tendency to wear the file mostly in the middle of its extent when the file is reciprocated only.

The apparatus 600 can be fabricated of substantially the same sort of materials as have been indicated as suitable for the other embodiments of the invention.

As the various embodiments are susceptible to numerous modifications without departing from the spirit of the invention, reference should be made to the accompanying claims to ascertain the actual scope of the invention.

I claim:

1. In chain saw sharpening apparatus, an elongated frame having front and rear ends, an elongated file of integral construction having first and second end portions and an intermediate extent that includes integral inflexible teeth that define a cutting surface of generally cylindrical configuration, a forward mounting means adjacent the front end of the frame for detachably and rotatably mounting the first end of the file on the frame, a rear means adjacent the rear end of the frame for detachably and rotatably connecting the frame to the file adjacent the second end of the latter, said frame having a projection adjacent its front end adapted for manual engagement by the user when manipulating the frame with the file rotating, said frame and file being so constructed and arranged so that the intermediate extent of the file is unobstructed radially by the frame in one lateral direction from the latter, said forward mounting means comprising said frame having an internally threaded opening therethrough at its front end that is axially aligned with the file, an externally threaded bearing adjustably threaded in said opening, and said bearing having an axial opening within which the first end portion of the file is journaled for rotation.

2. The combination of claim 1, wherein the front end of the frame is provided with means for releasably securing the bearing in a selected adjusted position.

3. The combination of claim 1, wherein the first end portion of the file has an integral radial enlargement having a surface of revolution in sliding engagement with an end of the bearing to constitute therewith a thrust bearing.

4. In chain saw sharpening apparatus, an elongated frame having front and rear ends, an elongated file having first and seconds ends and an intermediate extent having a cutting surface of generally cylindrical configuration, a forward mounting means adjacent the front end of the frame for detachably and rotatably mounting the first end of the file on the frame, a rear means adjacent the rear end of the frame for detachably and rotatably connecting the frame to the file adjacent the second end of the latter, said frame having a projection adjacent its front end adapted for manual engagement by the user when manipulating the frame with the file rotating, said frame and file being so constructed and arranged so that the intermediate extent of the file is unobstructed radially by the frame in one lateral direction from the latter, said frame being provided with coacting means adapted to coact with other guide means for guiding longitudinal movement of the frame in a direction parallel to the intermediate extent of the file, and prime mover means coupled to the second end of the file for rotating the latter, said frame including an elongated member having a flat surface, and with said coacting means comprising such elongated member having an elongated slot.

5. The combination of claim 4, together with a guide bracket, said guide bracket being adapted to straddle and be secured to a chain saw bar, said bracket having a bight portion that includes a spaced pair of side members defining a pair of parallel guide rails that are fixed relative to each other and adapted to receive the chain to be sharpened therebetween, and a pair of upstanding guide studs carried by the guide rails, said studs being slidingly and guidingly received by said slot and constituting said other guide means.

6. In chain saw sharpening apparatus, an elongated frame having front and rear ends, an elongated file having first and second ends and an intermediate extent having a cutting surface of generally cylindrical configuration, a forward mounting means adjacent the front end of the frame for detachably and rotatably mounting the first end of the file on the frame, a rear means adjacent the rear end of the frame for detachably and rotatably connecting the frame to the file adjacent the second end of the latter, said frame having a projection adjacent its front end adapted for manual engagement by the user when manipulating the frame with the file rotating, said frame and file being so constructed and arranged so that the intermediate extent of the file is unobstructed radially by the frame in one lateral direction from the latter, said cutting surface of the file being such as to be operative to cut an object against which it may be rotated and/or moved longitudinally, said cutting surface of said intermediate and generally cylindrical extent being defined by having a plurality of axially closely spaced, helically shaped cutting serrations that are inclined to the directrix of the generally cylindrical surface about 35° to about 45°, and said file also being provided with a plurality of axially widely spaced flutes of helical configuration that are inclined to the directrix less than about 15° and in a direction opposite to that of the serrations.

7. The combination of claim 6, wherein the file is provided with means for limiting endwise movement of the file in one direction relative to the frame, with such last recited means including the file having an integral radial enlargement that is spaced from one of the ends thereof, with the radial enlargement having a surface of revolution facing one of the ends of the file and adapted to serve as a thrust bearing.

8. In chain saw sharpening apparatus, an elongated frame having front and rear ends, an elongated file having first and second ends and an intermediate extent having a cutting surface of generally cylindrical configuration, a forward mounting means adjacent the front end of the frame for detachably and rotatably mounting the first end of the file on the frame, a rear means adjacent the rear end of the frame for detachably and rotatably connecting the frame to the file adjacent the second end of the latter, said frame having a projection adjacent its front end adapted for manual engagement by the user when manipulating the frame with the file rotating, said frame and file being so constructed and arranged so that the intermediate extent of the file is unobstructed radially by the frame in one lateral direction from the latter, said detachable connection of the file to the frame being between the intermediate extent of the file and spaced from the second end of the file with such spacing defining a drive end portion of the file, said drive end portion of the file being noncircular in transverse section, an electric drive motor, and means for detachably coupling the drive end portion of the file to the motor, said last means comprising the frame including an annular boss concentrically spaced about the drive end portion of the file, said motor having a tubular output shaft slidingly mateable with the noncircular portion of the file, and said electric motor having an annular boss concentrically spaced about the tubular output shaft, one of said bosses being slidingly receivable in the other boss, and means for releasably securing the bosses together against relative movement when said one boss is received in the other boss, with the arrangement being such that the tubular shaft is drivingly mated with the file when said one boss is received in the other boss.

9. A file for sharpening the teeth of saw chains comprising a straight and elongated file body having first and second ends, said file body having an intermediate extent of generally circular cylindrical configuration having a cutting surface such as to file an object against which it is rotated and/or moved longitudinally, said file body being provided with means between one of its ends and said intermediate extent for limiting endwise movement of the file body relative to any element engaged by such means, said last means including the file body being provided with an integral radial enlargement having a surface of revolution facing one of the ends of the file body, said cutting surface of the file being such as to be operative to cut an object against which it may be rotated and/or moved longitudinally, with the cutting surface of said intermediate and generally cylindrical extent being defined by having a plurality of axially closed spaced, helically shaped cutting serrations that are inclined to the directrix of the generally cylindrical surface about 35° to about 45°, and said file also being provided with a plurality of axially widely spaced flutes of helical configuration that are inclined to the directrix less than about 15° and in a direction opposite to that of the serrations.

* * * * *